Figure 1:
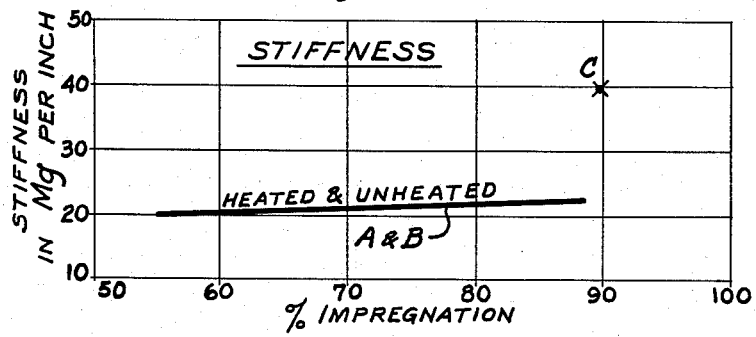

Dec. 6, 1960    J. R. WESCHLER ET AL    2,963,386
PRESSURE SENSITIVE ADHESIVE TAPE
Filed May 20, 1957                      2 Sheets-Sheet 1

INVENTOR.
JOSEPH R. WESCHLER
CHARLES BARTELL
BY
Harold Craist
ATTORNEY

United States Patent Office 2,963,386
Patented Dec. 6, 1960

2,963,386

PRESSURE SENSITIVE ADHESIVE TAPE

Joseph R. Weschler, New Brunswick, N.J., and Charles Bartell, Arlington, Mass., assignors, by mesne assignments, to Johnson & Johnson, New Brunswick, N.J., a corporation of New Jersey Filed May 20, 1957, Ser. No. 660,225

2 Claims. (Cl. 117—122)

This invention relates to a novel method for the manufacture of unified, flexible non-woven fibrous sheeting impregnated with a conjugated diene-nitrile or acrylic acid copolymer and to novel sheeting produced by said method. The invention also relates to a combination of such sheeting with a coating of a normally tacky and pressure-sensitive adhesive material.

Unified paper backings of the non-woven fibrous type are used to advantage in packaging, paint masking, bundling, mending and many other applications. In general, a desirable backing for these purposes is one that has high delamination resistance, wet and dry tensile, elongation and flexibility (low stiffness). It is well known to unify or strengthen internally paper backings by treatment of the paper with aqueous latices of elastomeric polymers, the sheets being impregnated in an amount sufficient to deposit substantial rubbery polymer solids in the web to bond the fibers thereof to a degree sufficient to lend the tape high internal strength. In certain instances, curing agents have been added to enhance even further the improvement in internal strength. Several previous backings, unified in the above manner, which had sufficiently high delamination resistances were too stiff and had low elongation. Unified backings which had suitable elongation and flexibility were poor in delamination resistance. Many of the prior unified backings utilizing curing agents not only had the aforementioned drawbacks but also were found to stain and discolor on aging.

Accordingly, it is an object of this invention to provide unified paper sheeting suitable for use as a backing element for a normally tacky and pressure-sensitive adhesive sheet wherein the backing has the characteristics of high delamination resistance, wet and dry tensile strength, elongation but low stiffness. It is a further object of this invention to provide a normally tacky and pressure-sensitive adhesive tape having the aforementioned properties. It is a further object of this invention to provide a novel method for producing unified paper webs and normally tacky and pressure-sensitive adhesive tapes having the characteristics set forth in the foregoing objects.

These and other objects of the invention will become apparent when consideration is given to the hereinafter detailed description of the invention.

In accordance with this invention, an open, porous saturable paper web is treated with an aqueous dispersion including an elastomeric copolymer of a conjugated diene and a monomer selected from the group of aliphatic unsaturated nitriles and acrylic acids. The impregnated paper is then dried and subsequently subjected to a fluxing or fusing heat treatment. Paper backings treated in the aforementioned manner when compared to an identical unheated impregnated backing show a large increase in delamination resistance and dry and wet tensile with only a negligible loss in elongation and softness (flexibility). Also, by forming unified backings in accordance with this invention it is possible to obtain tape backings of excellent delamination resistances by using lower levels of impregnation than are used by the presently known methods.

Various types of fibrous webs may be employed as the sheet material of this invention as long as the web is porous and can be completely saturated. The web may be made in part or in whole from wood, rope or rag fibers or other fibrous material, natural or synthetic. Preferably, paper webs of the conventional type employed as backings for normally tacky and pressure-sensitive adhesive types, such as those formed of kraft pulp and the like, are used. The paper may be flat or it may be creped, crimped, embossed or otherwise treated so as to provide rugosities or corrugations whereby stretchability of the sheet is increased.

As indicated heretofore, elastomeric copolymers suitable for use in this invention are copolymers of conjugated dienes and aliphatic unsaturated nitrile or acrylic acids. The diene content is in general between 97% to 50% by weight and, preferably, 85 to 70% by weight if a diene-aliphatic nitrile copolymer is employed and in general 98 to 65% and preferably 95 to 75% by weight if a diene-acrylic acid copolymer is used. The preferred diene of the diene copolymers is butadiene although other dienes may be used such, for example, as alkyl or aryl substituted dienes including isoprene (methyl butadiene). The preferred unsaturated nitrile copolymerized with the diene is acrylonitrile. Other nitriles which may be used are alpha methacrylic nitrile, alpha-ethacrylic nitrile and alpha-isopropyl-acrylic nitrile. The preferred acrylic acid monomer used in forming the diene-acrylic acid polymer is methacrylic acid. Examples of other suitable acids for such purposes are acrylic acid, ethacrylic acid and the like.

As is well known to those skilled in the field, the copolymers useful in this invention may be formed by polymerizing the monomers in any conventional manner, such as by emulsion polymerization. The latices used in accordance with this invention are aqueous dispersions of the copolymers, and are emulsified with a suitable emulsifying agent or dispersing agent which provide a stable dispersion of the copolymer, such as potassium rosinate or sodium stearate. A stable dispersion will usually result where the amount of dispersing agent ranges between ½ and 15 percent of the copolymer. In general, the solids contents in the aqueous dispersion is in the range of approximately 15 to 60% by weight of the total weight of the dispersion.

Other ingredients of the type conventionally employed in latex impregnant may be included within the impregnated composition used in this invention. Exemplary of such materials are conventional antioxidants, such as hydroquinone monobenzyl ether used to stabilize the polymer, pigments, dyes, etc.

In accordance with this invention, the fibrous web is impregnated with the latex in amount sufficient to enable incorporation of the dry solids of the impregnant into the sheet in an amount approximately 20 to 150% and, preferably, 50 to 80% by weight of the dry non-impregnated sheet. The impregnated sheet is then dried in a conventional manner at a suitable temperature generally in the range from 135° F. to 200° F. The dried sheet is then subjected to a fusing or fluxing heat treatment. In general, the impregnated sheet during the fluxing heat treatment is heated to a temperature in the range of about 250° F. to about 400° F. and, preferably in the range of 325° to 380° F. As is well known to those skilled in the field, the time required for fluxing will vary depending upon the fluxing temperature that is employed. For example, when the fluxing temperature is 250° F., a fluxing time of 15 minutes is adequate, while if the fluxing temperature is 380° F. a fluxing time of 1 minute is satisfactory. Of course, if the fluxing temperature is between 250° F. and 380° F. such, for example as 325° F., the fluxing time required will be between 15 minutes and 1 minute such, for example, as 5 minutes.

The following example is a recipe for the formation of butadiene-acrylonitrile latices to be used in accordance with the present invention, the copolymers being formed in the conventional manner by emulsion polymerization at 41° F. Unless otherwise indicated the parts given are by weight:

EXAMPLE I

Ingredients: Parts
Butadiene and acrylonitrile monomers _____ 100.00
Sulfole B-8 _____ (¹)
KCl _____ 0.7
Emulsifier (50/50 mixture of K fatty acid
  soap and Dresinate 214) _____ 4
Triton R-100 _____ 0.04
Sodium formaldehyde sulfoxylate _____ 0.05
Para methanehydroperoxide _____ 0.05
Cumene hydroperoxide _____ 0.10
Water _____ 136.00
Activator:
  $FeSO_4 \cdot 7H_2O$ _____ 0.05
  Versene Fe-3 _____ 0.023
  Water _____ 4.0

¹ Added in amount to give desired Mooney viscosity.

The data in following Table I illustrates the effect on delamination resistance of a butadiene-acrylonitrile copolymer impregnated sheet when subjected to a fluxing heat treatment in accordance with the present invention.

The sheets of Examples II–XI are all 30 lb. creped kraft saturating type paper impregnated with butadiene-acrylonitrile copolymers prepared in accordance with Example I, said copolymers having varying monomers having varying monomer ratios as indicated by given examples. The impregnant in each of the Examples II–XI was 99.5% copolymer and 0.5% antioxidant. The level impregnation in each case as indicated in the table was 40–70%. The sheets were impregnated in a conventional manner by the utilization of conventional squeeze roll equipment.

Each of the sheets of Examples II–XI were dried in a conventional manner and tested for delamination resistance. The impregnated sheets were then fluxed for 1 minute at 380° F. and tested for delamination resistance. The values obtained are recorded in Table I which follows:

Table I

| Ex. | Butadiene/ Acrylonitrile Chg. Ratio | Mooney | Delam. Res. No Heat | Delam. Res. 1 min. @ 380° F. | Percent Impregnation |
|---|---|---|---|---|---|
| II | 85/15 | 48 | 27 | 30 | 43.5 |
| III | 85/15 | 83 | 25 | 38 | 50.0 |
| IV | 85/15 | 127 | 22 | 33 | 46.2 |
| V | 75/25 | 50 | 32 | 53 | 55.1 |
| VI | 75/25 | 88 | 29 | 54 | 46.2 |
| VII | 75/25 | 118 | 25 | 44 | 69.0 |
| VIII | 65/35 | 40 | 29 | 46 | 62.0 |
| IX | 65/35 | 85 | 32 | 41 | 48.7 |
| X | 65/35 | 138 | 32 | 39 | 55.1 |
| XI | 55/45 | 176 | 36 | 53 | 56.4 |

It will be observed from Table I that an improvement in delamination resistance is obtainable by subjecting a butadiene-acrylonitrile impregnated sheet to a fluxing treatment in accordance with the present invention.

A study was made on a 27 lb. creped kraft saturating paper impregnated with a commercial butadiene-acrylonitrile copolymer (70:30), to determine the effect of varying time and temperature of the fluxing treatment on wet tensile, delamination resistance, dry tensile and elongation. The copolymer used was a butadiene-acrylonitrile copolymer manufactured by B. F. Goodrich Chemical Company and sold under the trade name "Hycar 1562" latex. The percent impregnation was 80%. In the following Table 2 are reported the conditions of time and temperature and the results obtained by such treatment.

Table 2

| Sample | W. Tensile, lbs. | Del. Res., ozs. | Dry Tensile, lbs. | Percent Elong. |
|---|---|---|---|---|
| Control (no heat) | .6 | 41.6 | 11.6 | 20.8 |
| 30 min. @ 250° F | 7.5 | 57.6 | 13.1 | 23.9 |
| 2 min. @ 300° F | 5.3 | 48.8 | 13.3 | 23.9 |
| 15 min. @ 300° F | 9.3 | 52.0 | 14.6 | 21.5 |
| 1 min. @ 350° F | 6.6 | 52.8 | 12.7 | 23.9 |
| 1 min. @ 400° F | 8.1 | 56. | 14.6 | 22.1 |

It is observed from studying the data in Table 2 that in all instances wherein the sheet is fluxed in accordance with the present invention, there is an improvement in delamination resistance and wet tensile strength with comparable dry tensile and elongation when compared to the unfluxed control sheet. Moreover, it will be noted that as the temperature of fluxing is increased the time required for similar improvement is descreased.

Figure 4:
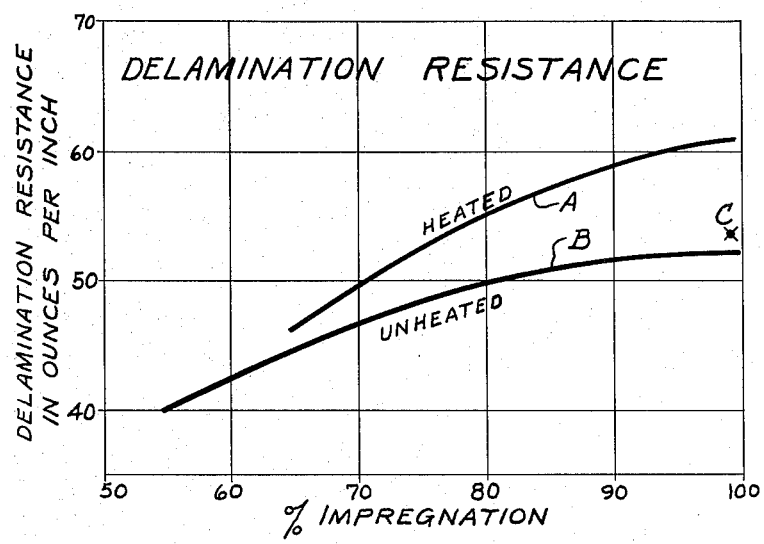
Figure 5:
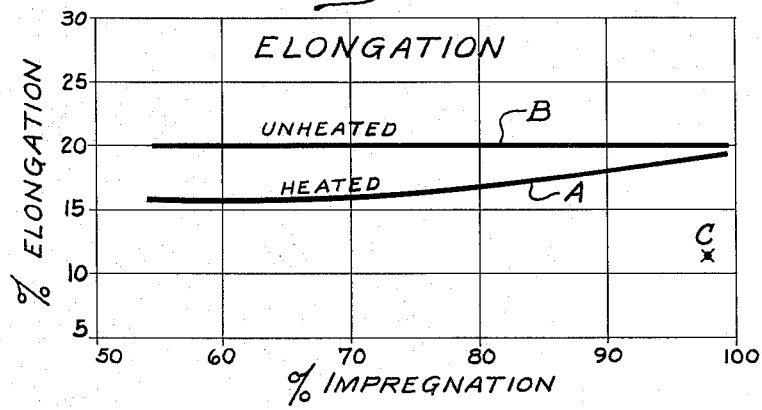
Figure 6:
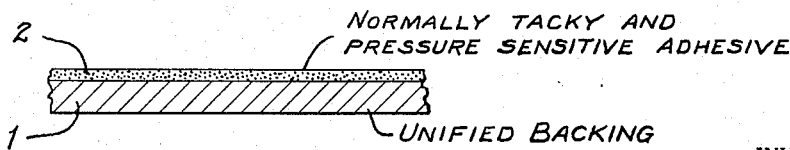

Reference is now made to the Figs. 1–6 of the accompanying drawings. Figures 1–5 illustrate in the form of graphs the effect of varying the percent impregnation of an impregnant on the stiffness (Fig. 1), dry tensile (Fig. 2), wet tensile (Fig. 3), delamination resistance (Fig. 4) and elongation (Fig. 5) of an impregnated backing. Fig. 6 illustrates a normally tacky and pressure-sensitive adhesive sheet formed in accordance with the present invention consisting of a unified backing 1 having thereon a normally tacky and pressure-sensitive adhesive. In the graphs of Figs. 1–5, line A represents the physical properties of a 30 lb. kraft paper, impregnated with a butadiene-acrylonitrile copolymer (70:30) sold as "Hycar 1562," at various levels of impregnation and fluxed at 380° F. for 1 minute. Line B represents the phyaical properties of an identical impregnated sheet with the exception that it has not been subjected to a heat treatment. Point C represents a conventional unified paper which has been impregnated at the indicated level with a conventional impregnant comprising butadiene-acrylonitrile (70:30 monomer ratio) in an amount of 55% by weight, butadiene-styrene copolymer (50:50 monomer ratio) in an amount of 25% by weight, butadiene-styrene copolymer (15:85 monomer ratio) in an amount 19.5% by weight and 0.5% by weight of "Versene."

Figure 2:
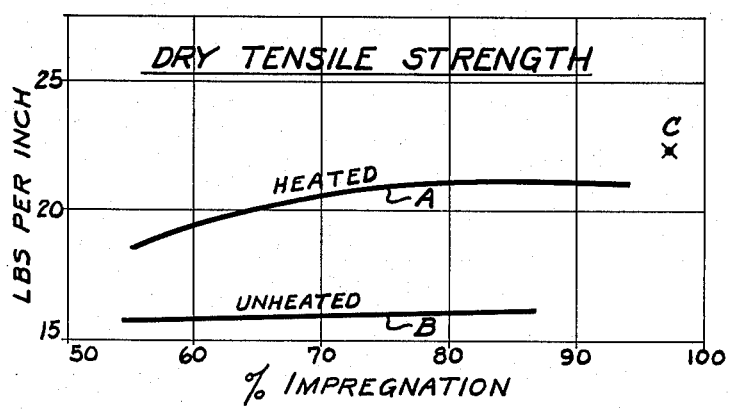
Figure 3:
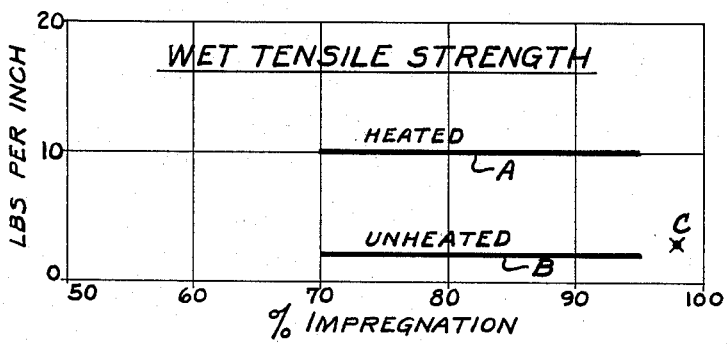

It is observed from Fig. 1 that the unified papers (line A) prepared in accordance with the present invention have a stiffness equal to an identical unheated sheet (line B) but much less than that of the conventional unified sheet exemplified by point C. Fig. 2 shows the fluxed sheets (A) of this invention to have a much higher dry tensile strength than identical but unheated sheets (B) and for the same level of impregnation a dry tensile strength comparable with the presently known unified sheet (C). Fig. 3 shows the sheets (A) of the present invention to have a much higher wet tensile strength than identical but unheated sheets (B) and known impregnated sheet (C), while Fig. 4 shows the same to be true with respect to delamination resistance. Fig. 5 shows the unified sheets (A) of this invention to have a higher elongation than the presently known unified sheet (C) and at higher levels of impregnation an elongation substantially the same as identical but unheated sheets (B). In summary, the results shown in Figs. 1–5 show that the unified sheets of the present invention possess outstanding overall characteristics with respect to their physical properties enabling them to be highly useful as a tape backing. Not only is it possible to obtain a stronger backing in accordance with this invention, but it is possible to employ lower levels of impregnation and still obtain an excellent backing. By using a lower level of impregnation it is possible to obtain at lower cost a backing of high overall delamination resistance, wet and dry tensile strength and flexibility characteristics.

The following Example XII is a recipe for the formation of butadiene-acrylic acid copolymers to be used in accordance with the present invention, the copolymers being formed in the conventional manner by emulsion polymerization at 122° F.

EXAMPLE XII

| Ingredients: | Parts |
|---|---|
| Butadiene-acrylic acid monomers | 100.00 |
| Dodecyl mercaptan (commercial grade) | (1) |
| Daxad 11 | 0.4 |
| Triton X-301 | 4.0 |
| AZO diisobutyronitrile | 0.3 |
| Water (boiled and cooled under nitrogen) | 140.00 |

1 Added in an amount to give desired Mooney viscosity.

The data in following Table 3 illustrates the effect on delamination resistance of a butadiene-methacrylic acid copolymer impregnated sheet when subjected to a fluxing heat treatment in accordance with the present invention.

The sheets of Examples XIII-XIX are all 30 lb. creped kraft saturating type paper impregnated with butadiene-methacrylic acid copolymers prepared in accordance with Example XII, said copolymers having varying monomer ratios as indicated by the given examples. The impregnant in each of the Examples XIII-XIX was 99.5% copolymer and 0.5% antioxidant. The level of impregnation in each instance is indicated in the Table 3.

Each of the impregnated sheets of Examples XIII-XIX were dried in a conventional manner and tested for delamination resistance. The impregnated sheets were then fluxed for 1 minute at 360° F. and 1 minute at 380° F. and tested for delamination resistance. The values obtained are recorded in Table 3 which follows:

Table 3

| Ex. | Butadiene Methacrylic Acid Chg. Ratio | Mooney | Delamination Resistance | | | Percent Impreg. |
|---|---|---|---|---|---|---|
| | | | No Heat | 1 min. @ 360° F. | 1 min. @ 380° F. | |
| XIII | 97/3 | 55 | 26.6 | 31.8 | 33.8 | 64.1 |
| XIV | 97/3 | 126 | 23.7 | 29.6 | 34.7 | 61.5 |
| XV | 97/3 | 120 | 33.4 | 45.3 | 48.2 | 68 |
| XVI | 87/13 | 47 | 42.3 | 49.5 | 54 | 59 |
| XVII | 87/13 | 120 | 39.3 | 54 | 57.5 | 61 |
| XVIII | 80/20 | 50 | 55 | 61 | 64.3 | 68 |
| XIX | 80/20 | 132 | 50.8 | 58.4 | 66.4 | 73.1 |

It will be observed from Table 3 that an improvement is obtained in delamination resistance by subjecting a butadiene-methacrylic acid copolymer impregnated sheet to a fluxing treatment in accordance with this invention. In general, the delamination resistance increases for a fixed fluxing time when the fluxing is carried out at a higher temperature.

As indicated heretofore, the unified papers formed in accordance with this invention are particularly useful as backings of normally tacky and pressure sensitive adhesive tapes such as masking tapes. Any suitable normally tacky and pressure-sensitive adhesive useful in masking tapes may be used. Such adhesives are generally compounded from a composition of synthetic rubber or similar elastomeric polymer, and a resinous component compatible with the rubber and adapted to impart tack to the adhesive composition, together with suitable amounts of various types of additives such as conventional fillers, antioxidants, etc. The elastomer component, tackifying resin, and fillers, when used, are proportioned to obtain in the adhesive properties of high internal strength and cohesiveness and high adhesiveness.

Examples of specific adhesive compositions useful in forming the novel tapes in accordance with this invention are as follows:

TYPE A

| Milled pale crepe rubber | 100 |
|---|---|
| Polybetapinene resin | 75 |
| Petroleum oil | 5 |
| Polymerized trimethyldihydroquinoline | 2 |

TYPE B

| Milled smoked sheet rubber | 100 |
|---|---|
| Zinc oxide | 50 |
| Dehydrogenated rosin | 75 |
| Sym. di-beta-napthyl-paraphenylene diamine | 2 |
| Lanolin | 10 |

TYPE C

| Butadiene-styrene copolymer (butadiene-styrene ratio 70:30 Mooney value 50) | 50 |
|---|---|
| Smoked sheet | 50 |
| Ester of hydrogenated rosin | 50 |
| Polymerized trimethyldihydroquinoline | 2 |
| Petroleum oil | 20 |

TYPE D

| Polyvinyl ethyl ether resin intrinsic viscosity=2.37 | 100 |
|---|---|
| Hydrogenated rosin | 5 |
| Phenylalpha naphthylamine | 0.35 |
| Polyethylene glycol 400 (di, tri) ricinoleate | 1.5 |

TYPE E

| Polyisobutylene high polymer, solid | 100 |
|---|---|
| Polyisobutylene polymer, viscous | 70 |
| Toluene | 520 |

In forming the novel tapes of this invention, the adhesive may be applied to the unified paper of the invention in any conventional manner, as for example by calendering, reverse roll-coater, knife-coater, etc. The adhesive is generally coated at a dry coating weight of about 1 to 3 ounces per sq. yd. The adhesive is preferably applied to the unified paper from solvent solution or dispersion using aliphatic or aromatic solvents and subsequent drying. If desired, the backing may be provided with a suitable conventional priming coating to improve the adhesive of the coating thereto. Suitable primer coatings are, for example, those disclosed in Bemmels Patent No. 2,647,843. Bonding between adhesive and impregnated paper may also be improved by the addition of a minor amount of a butadiene-styrene latex to the impregnant. Reference is now made to Fig. 6 of the accompanying drawings which shows in cross section a tape prepared in accordance with the present invention. The tape comprises a unified backing 1 formed in accordance with the teachings of this invention and having on one side a coat 2 of a normally tacky and pressure-sensitive adhesive.

The invention in its broader aspects is not limited to the specific steps, methods, compositions, combinations and improvements described but departures may be made therefrom within the scope of the accompanying claims without departing from the principles of the invention and without sacrificing its chief advantages.

It is claimed:

1. The method of forming a normally tacky and pressure-sensitive adhesive sheet which comprises impregnating a fibrous web with an aqueous dispersion of bonding particles including a conjugated diene-acrylic acid elastomeric copolymer, said bonding particles being free of a curing agent, drying said impregnated sheet and subjecting said impregnated web to a fluxing heat treatment by heating said impregnated web in the absence of a curing agent at a temperature between about 250 to 400° F. for a minimum period of time in the range of about 1 to 15 minutes, said temperature range and said time range being in inverse order with respect to one another, and applying to at least one major surface of said impregnated web a coating of a normally tacky and pressure-sensitive adhesive.

2. A normally tacky and pressure-sensitive adhesive sheet formed in accordance with the method of claim 1.

References Cited in the file of this patent

UNITED STATES PATENTS

| | | |
|---|---|---|
| 2,592,550 | Engel et al. | Apr. 15, 1952 |
| 2,633,430 | Kellgren et al. | Mar. 31, 1953 |
| 2,647,843 | Bemmels | Aug. 4, 1953 |
| 2,725,981 | Abere et al. | Dec. 6, 1955 |
| 2,726,967 | Eger et al. | Dec. 13, 1955 |

FOREIGN PATENTS

| | | |
|---|---|---|
| 514,599 | Canada | July 12, 1955 |